(12) United States Patent
Lash

(10) Patent No.: US 8,607,742 B2
(45) Date of Patent: Dec. 17, 2013

(54) RESTRAINT DEVICE

(71) Applicant: James R. Lash, Artesia, NM (US)

(72) Inventor: James R. Lash, Artesia, NM (US)

( * ) Notice: Subject to any disclaimer, the term of this patent is extended or adjusted under 35 U.S.C. 154(b) by 0 days.

(21) Appl. No.: 13/763,817

(22) Filed: Feb. 11, 2013

(65) Prior Publication Data

US 2013/0145994 A1     Jun. 13, 2013

Related U.S. Application Data

(63) Continuation-in-part of application No. 12/803,567, filed on Jun. 29, 2010, now Pat. No. 8,397,545.

(51) Int. Cl.
*A01K 15/00* (2006.01)
*E05B 75/00* (2006.01)

(52) U.S. Cl.
USPC ............................ 119/796; 119/800; 70/16

(58) Field of Classification Search
USPC ......... 119/796, 800, 801, 802, 803, 804, 805, 119/806, 807, 808, 817, 818, 819; 70/15, 70/16, 18, 19
See application file for complete search history.

(56) References Cited

U.S. PATENT DOCUMENTS

| | | | | |
|---|---|---|---|---|
| 1,586,412 | A * | 5/1926 | Curtis | 70/18 |
| 1,803,280 | A * | 4/1931 | Stull et al. | 70/16 |
| 3,540,769 | A * | 11/1970 | Rosser | 294/119.2 |
| 3,727,337 | A * | 4/1973 | Hancox | 42/1.12 |
| 3,819,108 | A * | 6/1974 | Jordan | 231/7 |
| 3,841,685 | A * | 10/1974 | Kolodziej | 294/100 |
| 3,949,514 | A * | 4/1976 | Ramsey | 43/87 |
| 3,998,459 | A * | 12/1976 | Henderson et al. | 463/47.3 |
| 4,071,023 | A * | 1/1978 | Gregory | 128/878 |
| 4,089,195 | A * | 5/1978 | Lai | 70/16 |
| 4,506,472 | A * | 3/1985 | Barman | 43/87 |
| 4,570,376 | A * | 2/1986 | Leggett et al. | 43/96 |
| 4,621,589 | A * | 11/1986 | Thinnes | 119/770 |
| 4,747,185 | A * | 5/1988 | Thacker | 452/58 |
| 4,811,775 | A * | 3/1989 | Sun | 70/16 |
| 5,330,181 | A * | 7/1994 | Wong | 463/47.4 |
| 5,459,957 | A * | 10/1995 | Winer | 42/70.11 |
| 5,460,373 | A * | 10/1995 | McNutt | 463/47.2 |
| 5,482,271 | A * | 1/1996 | McNutt | 119/808 |
| 5,752,731 | A * | 5/1998 | Crone | 294/24 |
| 5,893,799 | A * | 4/1999 | Studley et al. | 463/47.2 |
| 5,957,399 | A * | 9/1999 | Siana, Jr. | 242/377 |
| 6,026,661 | A * | 2/2000 | Spiropoulos | 70/16 |
| 6,254,561 | B1 * | 7/2001 | Borden | 602/24 |
| 6,334,444 | B1 * | 1/2002 | Sisco | 128/869 |
| 6,404,613 | B1 * | 6/2002 | Dowling et al. | 361/232 |
| 6,615,622 | B2 * | 9/2003 | MacAleese et al. | 70/16 |
| 6,963,480 | B2 * | 11/2005 | Eccles | 361/232 |
| 7,000,439 | B2 * | 2/2006 | DiDomenico | 70/16 |

(Continued)

*Primary Examiner* — Yvonne Abbott
(74) *Attorney, Agent, or Firm* — Paul B. Heynssens; Paul B. Heynssens Attorney at Law PLC

(57) ABSTRACT

A restraint device having a tubular body with a handle at one end and a telescopic extension rod at the other end which allows the overall length of the body to be selectively adjusted. A cuff is attached to a tether at the end of the rod in a non-deployed position. The tether can be released so a law enforcement officer can loosely control a detainee. Electrical circuitry in the body is connected to electrodes on the lower end of the handle and on the cuff so a disabling charge can be delivered. The device is also useful to civilians as a protective device when jogging, walking, bicycling or the like.

13 Claims, 11 Drawing Sheets

(56) References Cited

U.S. PATENT DOCUMENTS

| | | | |
|---|---|---|---|
| 7,029,397 B1 * | 4/2006 | Barwick | 463/47.4 |
| 7,210,317 B2 * | 5/2007 | Beane et al. | 70/16 |
| 7,246,575 B2 * | 7/2007 | Goto | 119/802 |
| 7,251,964 B2 * | 8/2007 | Wade | 70/16 |
| 7,316,621 B2 * | 1/2008 | Tufts | 463/47.4 |
| 7,340,926 B2 * | 3/2008 | Kim et al. | 70/16 |
| 8,176,878 B1 * | 5/2012 | Wexler | 119/801 |
| 2008/0173048 A1 * | 7/2008 | Kim et al. | 70/16 |
| 2010/0031709 A1 * | 2/2010 | Kim et al. | 70/16 |
| 2012/0085135 A1 * | 4/2012 | Louden | 70/16 |

* cited by examiner

RESTRAINT DEVICE

CROSS-REFERENCE TO RELATED APPLICATIONS

This patent application is a continuation-in-part of application Ser. No. 12/803,567, filed Jun. 29, 2010, the disclosure of which is incorporated herein by reference.

TECHNICAL FIELD

This description relates generally to a restraint device and more specifically to a device for physically restraining an individual as well as for selectively applying an electrical shock to control a combative or resistive individual or to deter or repel an attack by an individual or an animal. The device may be utilized by law enforcement personnel as well as by joggers, hikers, bicyclists, animal control officers and others.

BACKGROUND

There are various non-lethal control, defensive or restraining devices used by law enforcement and others to restrain and control detainees or to ward off an attacker. The simplest of these restraint devices are handcuffs, manacles or shackles which have been available and have been used for many years. Manacles are placed about the wrists of an individual or, in some cases, also placed about the ankles to restrict freedom of motion. While handcuffs and manacles are effective, an individual or detainee, in some instances, can free himself or herself from these devices either by disabling the lock or by manipulation in a manner to free the wrists or ankles.

More recently other devices have been developed to either restrain or temporarily incapacitate an individual. Aerosol defense sprays containing Capsicum or tear gas are well known. Stun guns use batteries to supply electricity to a circuit which includes multiple transformers which boost the voltage and reduce the amperage and which charge is stored in a capacitor. The capacitor builds up and stores the electrical charge and, upon activation, releases the charge to electrodes which is placed in contact with an individual, causing temporary interference with the individual's nervous system and muscular control to incapacitate the individual.

A variation of the stun gun is the more recently developed TASER® gun. TASER® devices work in the same basic way as stun guns, except the electrodes are positioned on the end of conductive wires attached to the electrical circuit of the TASER® device. When activated, gas pressure launches the electrodes and the attached wires. Small barbs are affixed to the electrodes so that they will attach to the individual's body or clothing. Electrical current travels through the conductive wires, stunning the individual in basically the same way as a conventional stun gun.

A main advantage of a TASER® device is that individuals can be brought under control at distances of up to 20 feet. Being able to maintain a distance or space between a detainee or would-be assailant, significantly decreases the risk to law enforcement personnel or intended victims.

While, as mentioned above, devices such as handcuffs, manacles, shackles, aerosol spray, stun guns and TASER® guns are effective in many situations, they all inherently have certain disadvantages. Accordingly, there exists a need for an effective restraint and control device which law enforcement and other individuals can use to restrain an individual while maintaining a space between the individual and law enforcement personnel. Further, there exists the need for a device of this type which can both provide physical restraint without electrical shock or in the case of more extreme resistance by a detainee, can also apply electrical shock to temporarily disable the individual. While the device has principal application to law enforcement, the device may also be used by civilians as a protective safety device in the event of an attack or threatened attack, as well as by animal control personnel.

Many of the attendant features will be more readily appreciated as the same becomes better understood by reference to the following detailed description considered in connection with the accompanying drawings.

SUMMARY

The following presents a simplified summary of the disclosure in order to provide a basic understanding to the reader. This summary is not an extensive overview of the disclosure and it does not identify key/critical elements of the example or delineate the scope of the example. Its sole purpose is to present some concepts disclosed herein in a simplified form as a prelude to the more detailed description that is presented later.

The present example provides a restraint and control device having an insulated handle at the upper or proximal end and a rod at the distal end which rod is telescopic within the handle so that the overall length of the restraint device can be adjusted. A lockable manacle or cuff is secured to the end of a tether. The manacle or cuff has a fixed arcuate section and a pivotal arm which is engageable in a lock on the fixed section to encircle the limb of an individual. The tether is a wire of stainless steel or other strong material which also serves as an electrical conductor. The end of the tether opposite the cuff is secured to a retractor within the handle. In the retracted position, the cuff is secured at the end of the telescopic rod so that the cuff and the restraint device are an integral, rigid assembly and the tether is fully retracted on to the retractor. In this position, the restraint and control device is rigid and can be attached to the limb of an individual at the cuff or manacle so the movements of the individual can be restrained and controlled by a law enforcement or other individual using the handle while still maintaining the restrained individual at a safe distance.

The tether can be released to free the cuff from the end of the rod. In this deployed position, the restrained individual will have more freedom of movement, but can still be controlled while maintained at a greater distance from the law enforcement or other individual.

The upper end of the handle of the restraint and control device houses a battery, transformer, capacitor and circuitry common to stun devices. This circuitry is connected to electrodes on the exterior of the distal end of the rod, as well as electrodes located within the cuff. A trigger, preferably within a trigger guard on the handle, can be operated to cause a high voltage, low amperage discharge to the electrodes which will deliver a disabling or stunning shock to the individual. The electrodes on the distal end of the rod will deter a detainee from attempting to grab the rod to wrestle it away from law enforcement personnel or other user.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a restraint device. Although the present examples are described and illustrated herein as being implemented in a ankle restraint system, the system described is provided as an example and not a limitation. As those skilled in the art will appreciate, the present examples are suitable for application in a variety of different types of restraint systems applicable to various extremities, and portions of those extremities.

Figure 1:
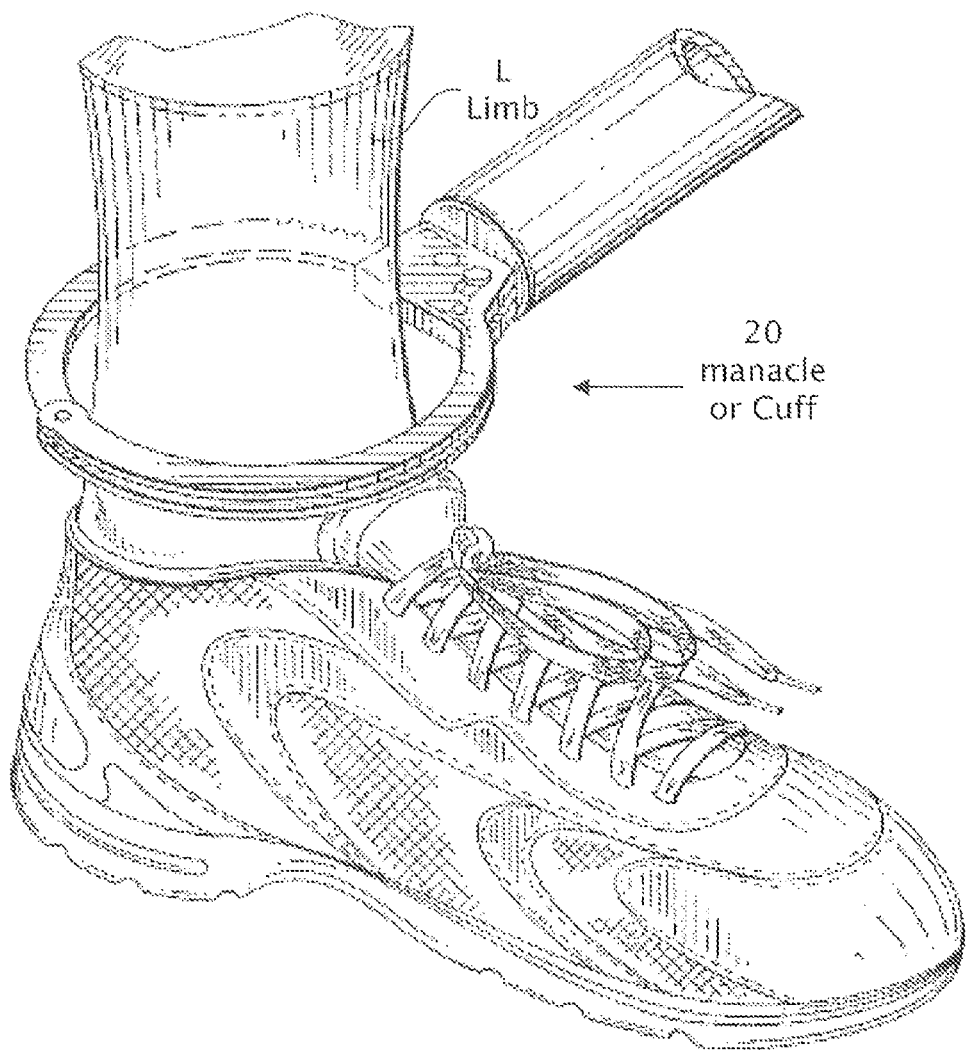
FIG. 1 is a partial perspective view showing the cuff on the distal end of the restraint device secured about the limb of a detainee.

FIG. 1 is a partial perspective view showing the cuff on the distal end of the restraint device secured about the limb of a detainee. The manacle 20, may be secured about a limb L such as an arm or a leg. Advantageously the manacle 20 may be applied without an officer, or other user having to be in close proximity either in attaching the manacle, or after it is applied. The manacle may be made in various sizes for us with humans and animals of various sizes. Use of eh restraint and control device advantageously allows an electrical stunning device to be used without having to apply electrodes to a torso. Such electrode placement away from the torso should greatly reduce risk of heart attack in those who have had a electrical stun applied to them.

Figure 2:
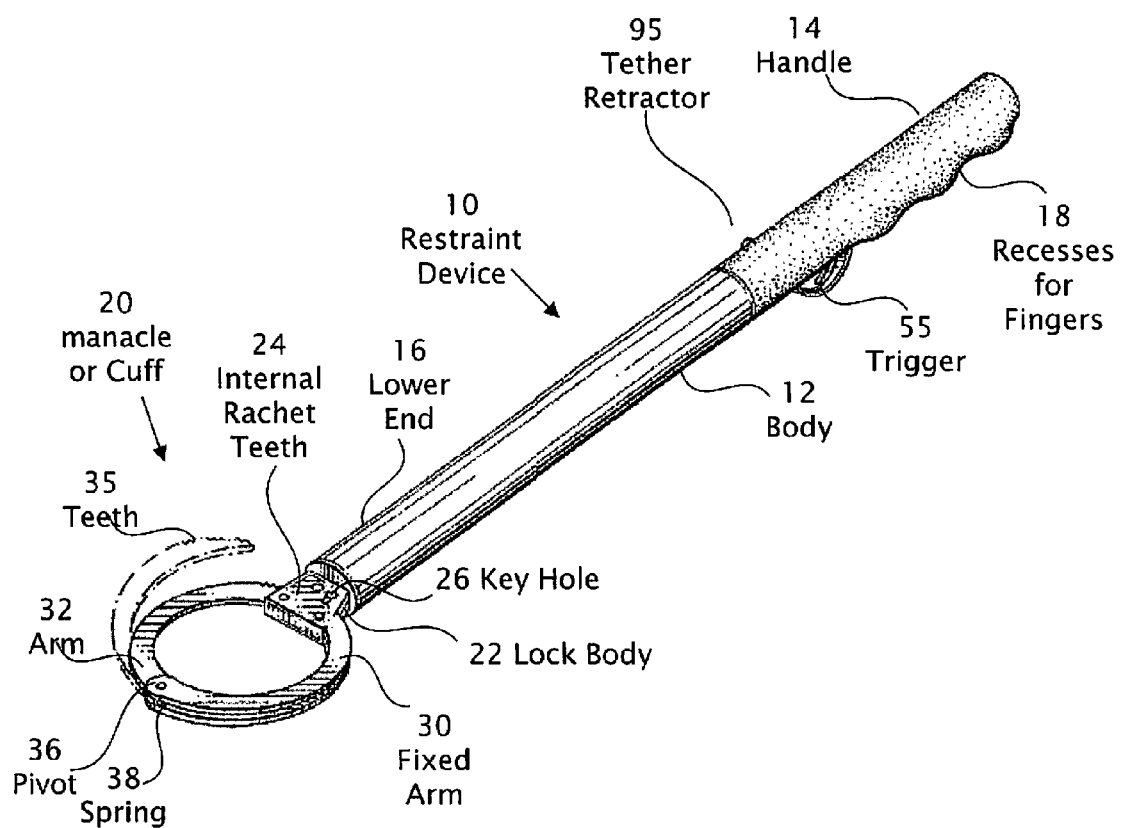
FIG. 2 is a perspective view of the restraint device of the present example shown in a retracted, rigid position.

FIG. 2 is a perspective view of the restraint device of the present example shown in a retracted, rigid position. The restraint and control device of the present example is shown and is generally designated by the numeral 10.

The restraint device 10 has an elongate, generally tubular body 12 having a handle 14 at its upper proximal end and a lower, distal end 16. The handle 14 may be a strong, lightweight non-conductive material such as a fiberglass or a polymeric composite, or the like. The tubular shape may be round as shown, but this is not limiting as the tube could have a square, elliptical, rectangular or other shaped outline.

At an upper end of the body 12 a handle may be disposed. The upper end of the handle 14 may be contoured having recesses 18 to receive the fingers of the user. The handle 14 may also be provided with a resilient covering, both for comfort of the user and which covering is insulated to protect the user from electrical shock.

A manacle or cuff 20 is positioned at the lower end 16 of the body 12. The manacle 20 may include a lock body 22, preferably of the double locking type, which has internal ratchet teeth 24 operable by a key (not shown) inserted in the lock opening 26 and rotated to open the ratchet teeth 24 and release the bolt of a double locking type lock. A fixed, generally arcuate arm 30 extends from one side of the lock body and is pivotally secured to arm 32 at pivot 36. A torsion spring 38 may be provided at pivot 36 to bias or urge the arm 32 to the open position when the arm 32 is unlocked. The distal end of arm 32 is provided with teeth 35 which are engageable with the ratchet teeth within the lock body and, in the locked position, the arm is prevented from opening and also prevented from further tightening. Handcuff locks of this type are known to those skilled in the art.

When the cuff 20 is placed about the limb of an individual, as shown in FIG. 1, and locked, the restraint device is rigid and can be used to restrain and control the movements of an individual. The cuff 20 can be opened at key lock 26 and the arm 32 will move to the open position under the influence of the spring 38. The user can engage the fixed arcuate section 30 about the limb of an individual and a quick, smart "snapping" wrist action will cause the locking arm 32 to be engaged in the lock so that the user does not have to bend down or come into close proximity with a restrained individual. Being able to maintain a distance from the individual to be restrained is a safety precaution and diminishes the possibility that the restrained individual can, in some manner, overcome or successfully resist restraint.

The restraint device 10 can be a unitary piece, but it may advantageously be constructed as two pieces coupled by a tether that provides additional advantages in use. In the two piece unit described herein, the manacle 20 couples to the body 12 by being shaped to fit in a receiving aperture disposed in the lower end of the body 12. The device 10 may remain rigid during application, and afterwards, if desired separated into two coupled pieces, coupled by a tether (not shown) to allow greater mobility. Separation may be accomplished by depressing a release 95, disposed in the body 12.

Figure 3:
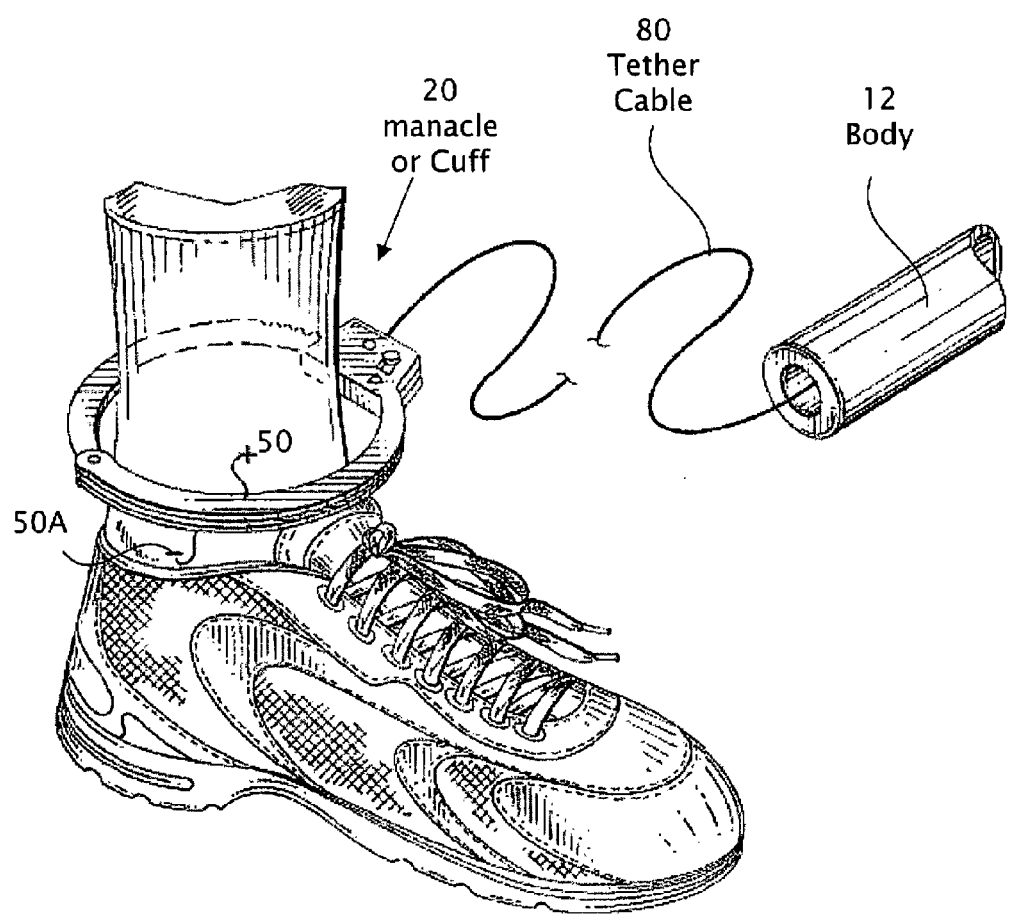
FIG. 3 is a partial perspective view showing the distal end of the restraint device of the present example secured about the limb of an individual in a position with the tether deployed.

FIG. 3 is a partial perspective view showing the distal end of the restraint device of the present example secured about the limb of an individual in a position with the tether deployed. Another feature of the present example is that the restraint allows the handle or body 12 to be loosely tethered to the restrained individual. In this way, the law enforcement officer or other user may maintain a greater distance from the detained individual, but still may maintain control of the detained individual.

A strong tether cable 80 is connected to the cuff 20. The cable may be a stainless steel or other wire that extends through the lower tubular elongate body 12 into the upper handle. The cable may incorporate electrical conductors 70 coupled to the electrodes 50, 50A, and activated by the officer in alternative examples of the restraint and control device including a TASER®, or other equivalent stunning device.

Before activation the cuff 20 may be held against a flush cut end of the tube 12, by the cable tension, as its retraction mechanism may be under spring bias. Being held against the flush cut tube by cable tension may also be augmented by other equivalent coupling mechanisms. For example a cone may be disposed on the manacle so that it retracts and centers when pulled into the hollow center of the tube 12. Alternatively any sort of aperture may be disposed in either the manacle 20 or tube 12 to recievabally couple to a mating surface provided on the component that will mate with it.

Figure 4:
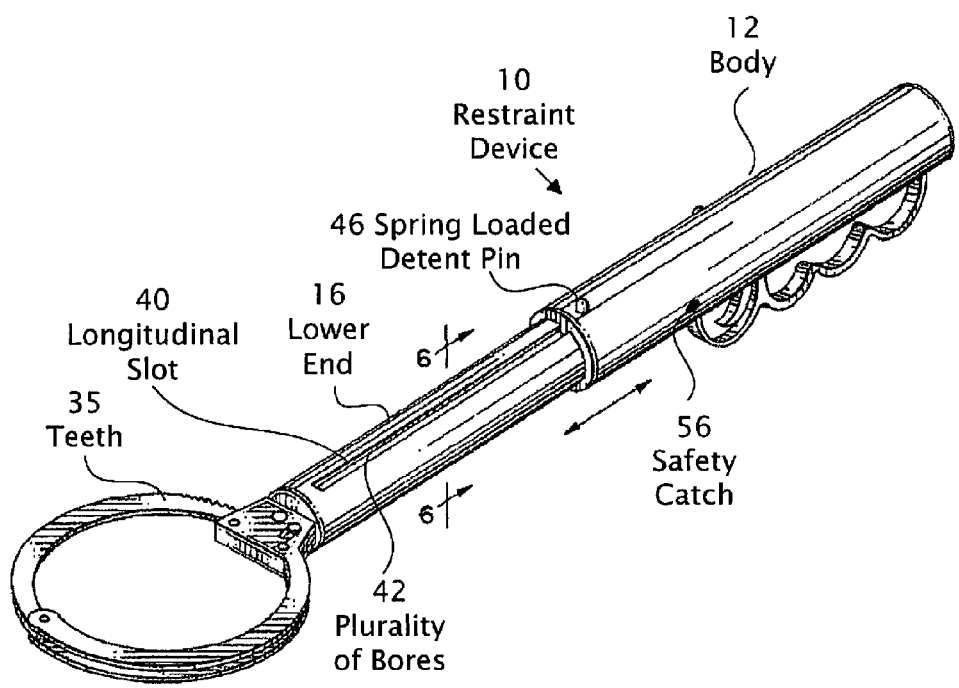
FIG. 4 is a perspective view of the restraint device of the present example showing the telescopic extension of the rod and of the cuff from the handle.

FIG. 4 is a perspective view of the restraint device of the including a telescopic extension of the rod and of the cuff from the handle. The device may be extensible so the user may adjust the length of the body 12. A lower rod end 16 is slidable within the tubular body 12. The lower rod end 16 defines a longitudinally extending slot 40 in which a plurality of bores 42 are provided. A spring-loaded detent pin 46 is provided at the lower end of the handle portion which is engageable in one of the bores to lock the rod at a selected position.

Figure 5:
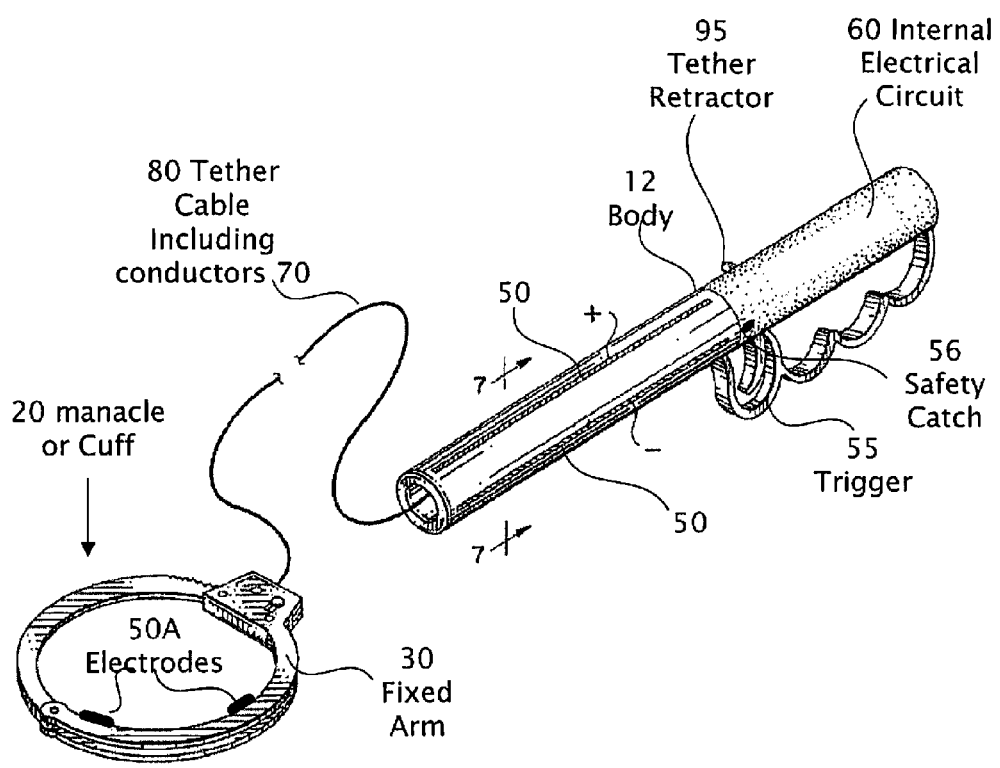
FIG. 5 is a perspective view similar to FIG. 4 showing the distal rod end retracted and the tether and cuff deployed, the rod being provided with electrodes for applying a stun or electrical shock to a detainee.

FIG. 5 is a perspective view of an alternative example of the restraint and control device similar to FIG. 4. The restraint device of the present example may also be provided with the capability of applying a high voltage, low amperage electrical charge to an individual to assist in restraining or stunning an individual who is resistive or combative.

The figure shows the distal rod end retracted and the tether and cuff deployed, and further includes the rod being provided with electrodes 50 for applying a stun or electrical shock to a detainee. To provide a shock a conventional circuit such as used in an electric fence, stun gun, or TASER® may be utilized, as in this example by including it in the body 12.

The electrical circuit 60 is connected via at least two conductors 70 to the electrodes 50 and, upon discharge, activated by a trigger 55 on the handle will send the electrical charge to the electrodes. The conductors 70 are contained within tether 80 or the tether 80 itself may serve as the conductor between the electrical circuit and the electrodes.

Additional electrodes 50A may also be located on the inner side of the arms of the cuff and are shown as fixed arms 30. A safety may be provided to lock the trigger 55 and prevent inadvertent discharge. The safety is conventionally constructed like a pushbutton safety on a firearms, as is well known to those skilled in the art. Alternatively other types of trigger locks may be used as safety's including bales latches and the like. The charge delivered to the electrodes 50A on the cuff from the circuit 60 will stun the restrained detainee. The electrodes 50 on the lower end of the body 12 of the device can be placed in contact with an unrestrained individual to subdue the individual. The electrodes 50 will also hold to fend off a restrained individual from attempting to grab the device and wrest it from law enforcement personnel or other user.

Figure 6:
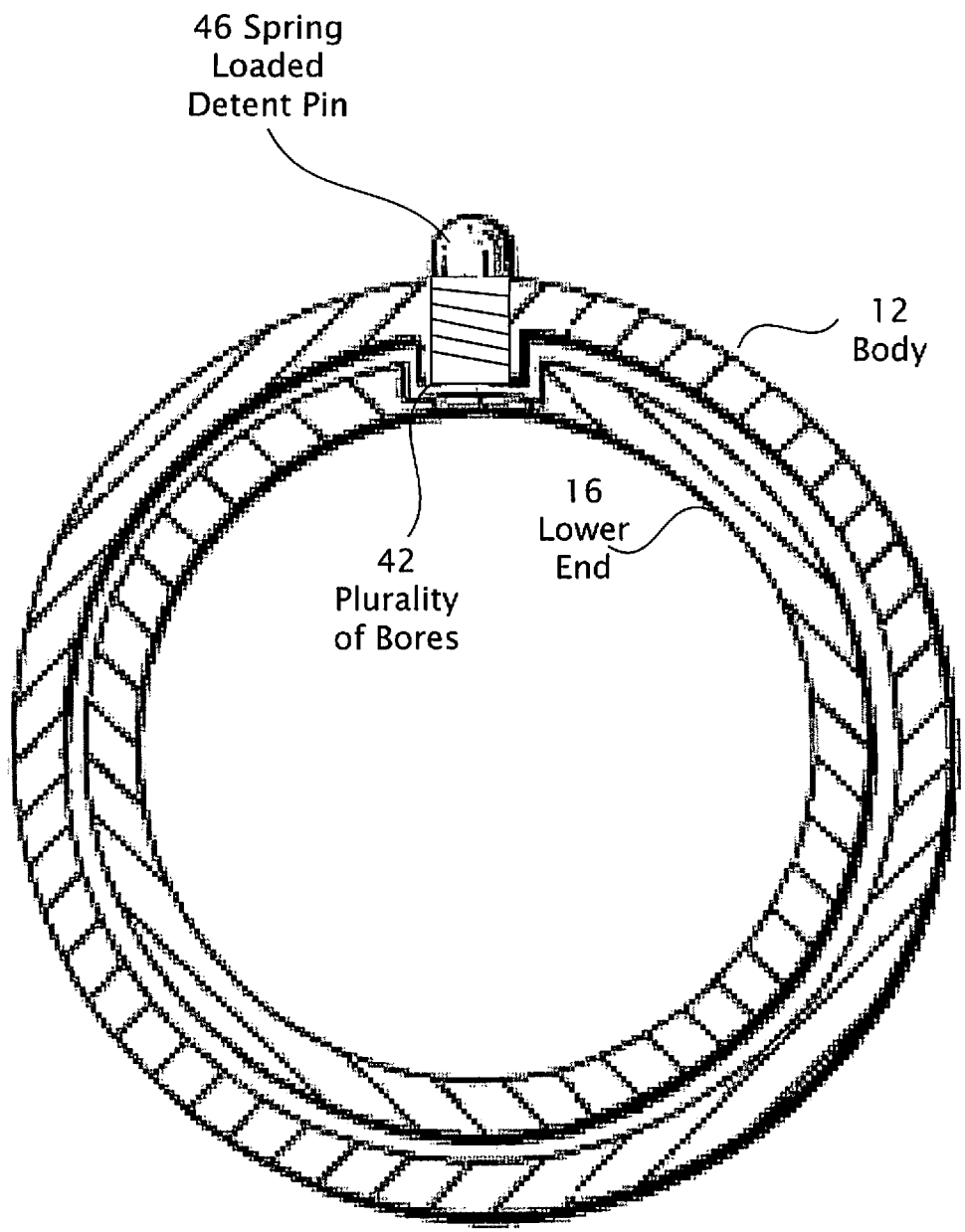
FIG. 6 is a sectional view taken along line 6-6 of FIG. 4.

FIG. 6 is a sectional view taken along line 6-6 of FIG. 4 and shows the detent pin 46 in an engaged position in one of the bores 42. The telescopic lower rod end 16 may also be adjusted by other convenient mechanisms such as an adjustable locking slip collar or the like. The body may also be non-adjustable having a fixed length either longer for law enforcement personnel or shorter for civilian use.

Figure 7:
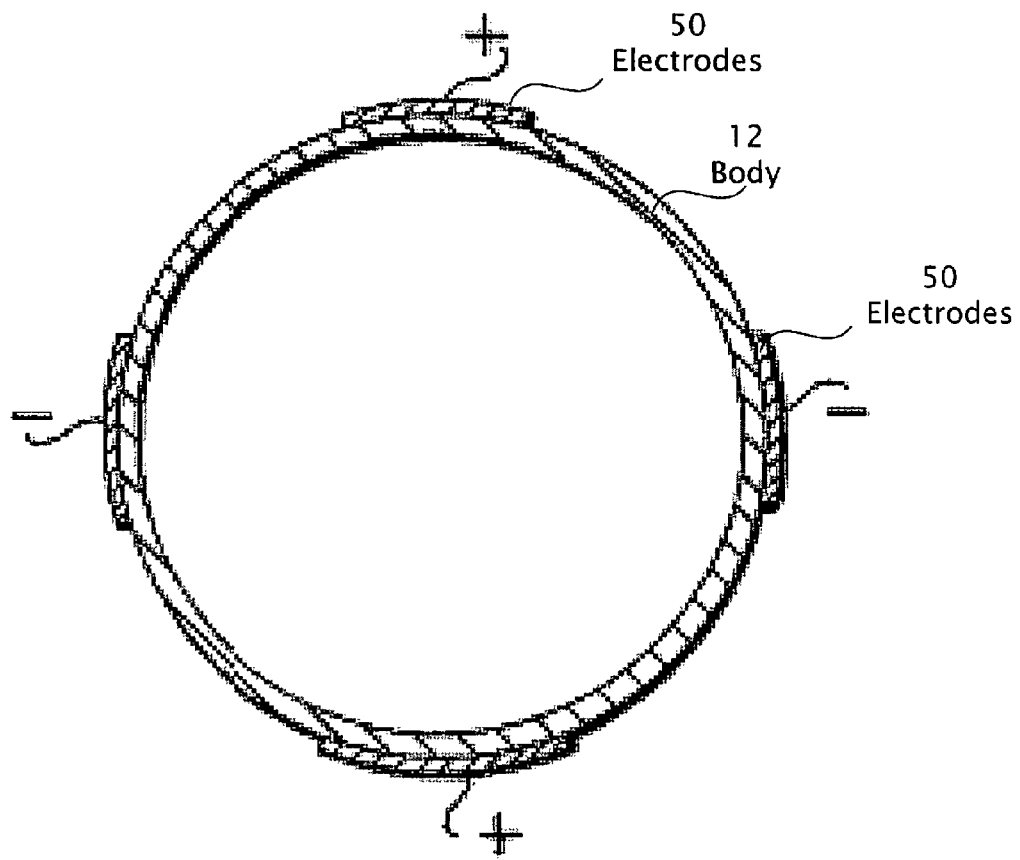
FIG. 7 is a sectional view taken along line 7-7 of FIG. 5.

FIG. 7 is a sectional view taken along line 7-7 of FIG. 5 and shows electrodes 50 disposed on the body 12. The body 12 can be provided with two or more pairs of electrodes 50. However, any number of electrodes, and patterns of electrodes are contemplated, two electrodes typically being a minimum number provided.

Figure 8:
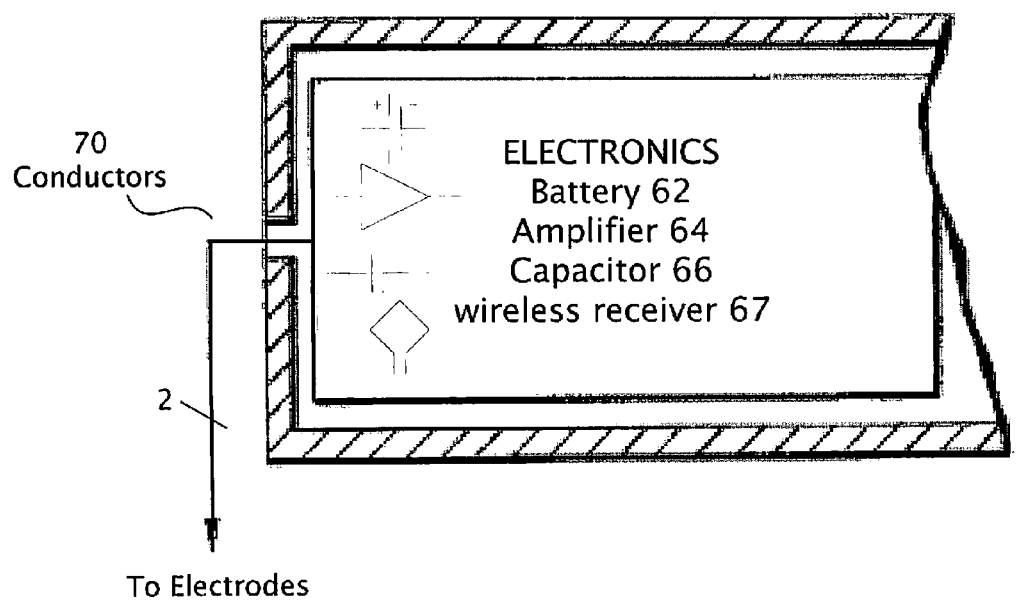
FIG. 8 is a schematic diagram showing the components of the electrical circuit housed within the handle of the restraint device as shown in FIG. 5.

FIG. 8 is a schematic diagram showing the components of the electrical circuit 60 that may be housed within the handle of the restraint device shown in FIG. 5. The electrodes previously shown may be coupled to an electrical circuit 60 within the handle. The electrical is a stunning circuit, conventionally constructed and may include a battery 62, voltage amplifier 64 and a capacitor 66 or their equivalents, which are conventional to stun guns and other devices such as TASER® devices. In addition a conventionally constructed wireless receiver and antenna 67 and associated circuitry may be included in the circuit to allow remote activation of the stunning circuit 60.

Figure 9:
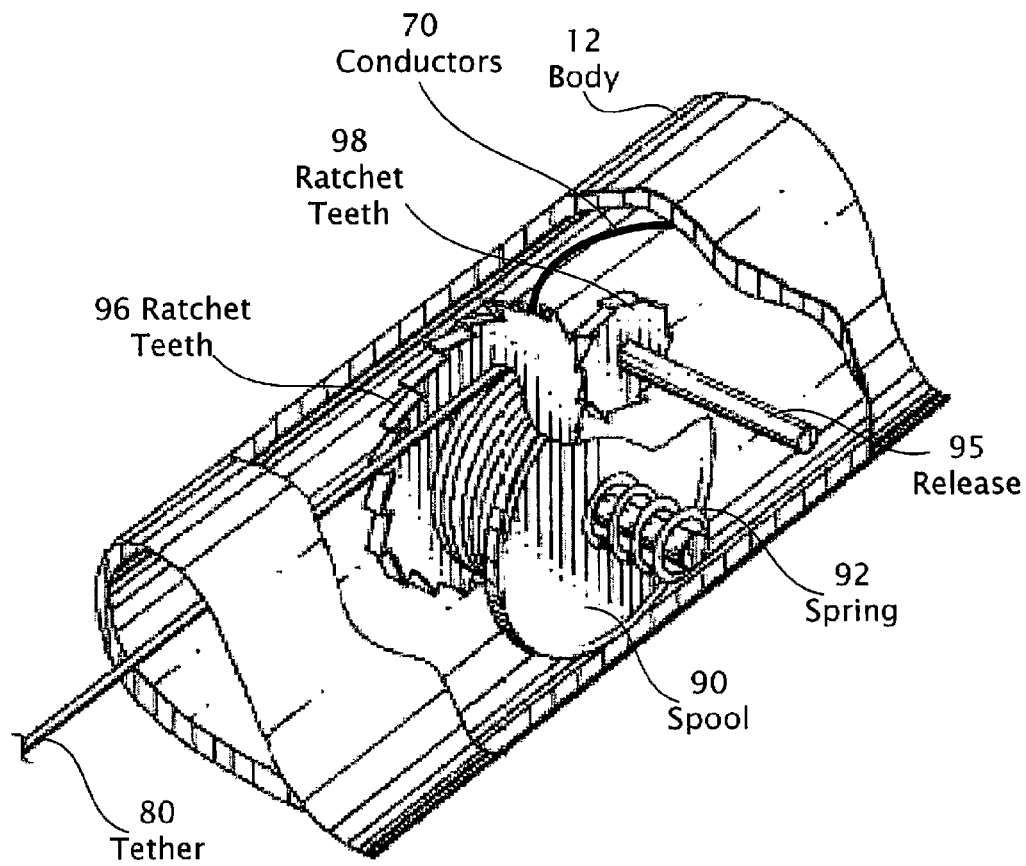
FIG. 9 is a detail view of the handle broken away to illustrate the retractor in the handle of the device for deploying and taking up the tether.

FIG. 9 is a detail view of the handle broken away to illustrate the retractor in the handle of the device for deploying and taking up the tether. The spool can be unlocked allowing the spring-biased spool to rewind the cable to return the cuff to the position shown in FIG. 2. The user can allow the spool to fully rewind the tether, placing the cuff in a secured position at the lower end of the body.

The upper end of the body (12 of FIG. 2) houses a spring-loaded retractor spool 90 upon which the cable 80 is wound. Spring 92 will urge the spool in a direction to wind the cable on the spool. When the law enforcement officer or other user wishes to deploy the cable, a shaft acting as a release 95 will disengage the teeth on the ratchet 98 from the teeth 96 on the spool, allowing the spring-biased spool to freely rotate to pay out or deploy cable 80 when the handle is pulled and the tether cuff engaged about the limb of an individual. Thus, the user can allow the connecting tether cable to extend to a desired length at which point the spool will be locked by ratchet teeth 98 engaging the release maintaining the cable at the desired length in a taut condition.

Tether 80 is unwound from spool 90, which may include spring bias by biasing spring 92. Spring bias is conventionally supplied for taking up the tether, or otherwise retracting it. A ratcheting mechanism is provided by teeth 86 on the edge of spool 90. Spool teeth may engage with a toothed spool 98, so that as the tether 80 is extended it is not automatically retracted. The tether may be retracted by pushing an exposed end of shaft 95 that is slideably disposed in apertures in the handle 12. Spring bias (not shown) may be provided to return the spool 98 to position. Other equivalent structures for deploying and retracting the tether 80 may be provided that function as described herein.

The tether 80 may have the conductors 70 disposed on it, or otherwise coupled to it, along its length so that when the tether plays off of the spool the conductors go with it. The conductors may be on the inside, or outside of the tether, or may be incorporated in the tether itself. For example with conductors on the interior the tether may be a woven tubular cable with the insulated conductors included in its core. If on the outside the conductors may be bonded or otherwise coupled to the tether. The tether may be made from any suitable conductive material like a steel braided cable, non-conductive material such as nylon cord, or a combination of materials or their equivalent.

Conductors 70 may be wound on a spool behind spool 90, and wound in the opposite direction to the tether 80 so that they unwind into the hollow handle when the tether is extended. This maintains the high voltage connection to the electronics (60 of FIG. 8) disposed in the handle. Alternatively a contactor arrangement, with brushes or the like may couple the electrical signals from the electronics (60 of FIG. 8) to the conductors 70 that have been incorporated into the tether 80.

Alternatively the conductors 70 may deploy separately from the tether 80 with their own deployment mechanism such as spring wire wound under tension so that the wires tend to quickly play off of a spindle upon which they are wound.

Other known equivalent retractor mechanisms including a manually windable retractor spool can be used in alternative examples.

Figure 10:
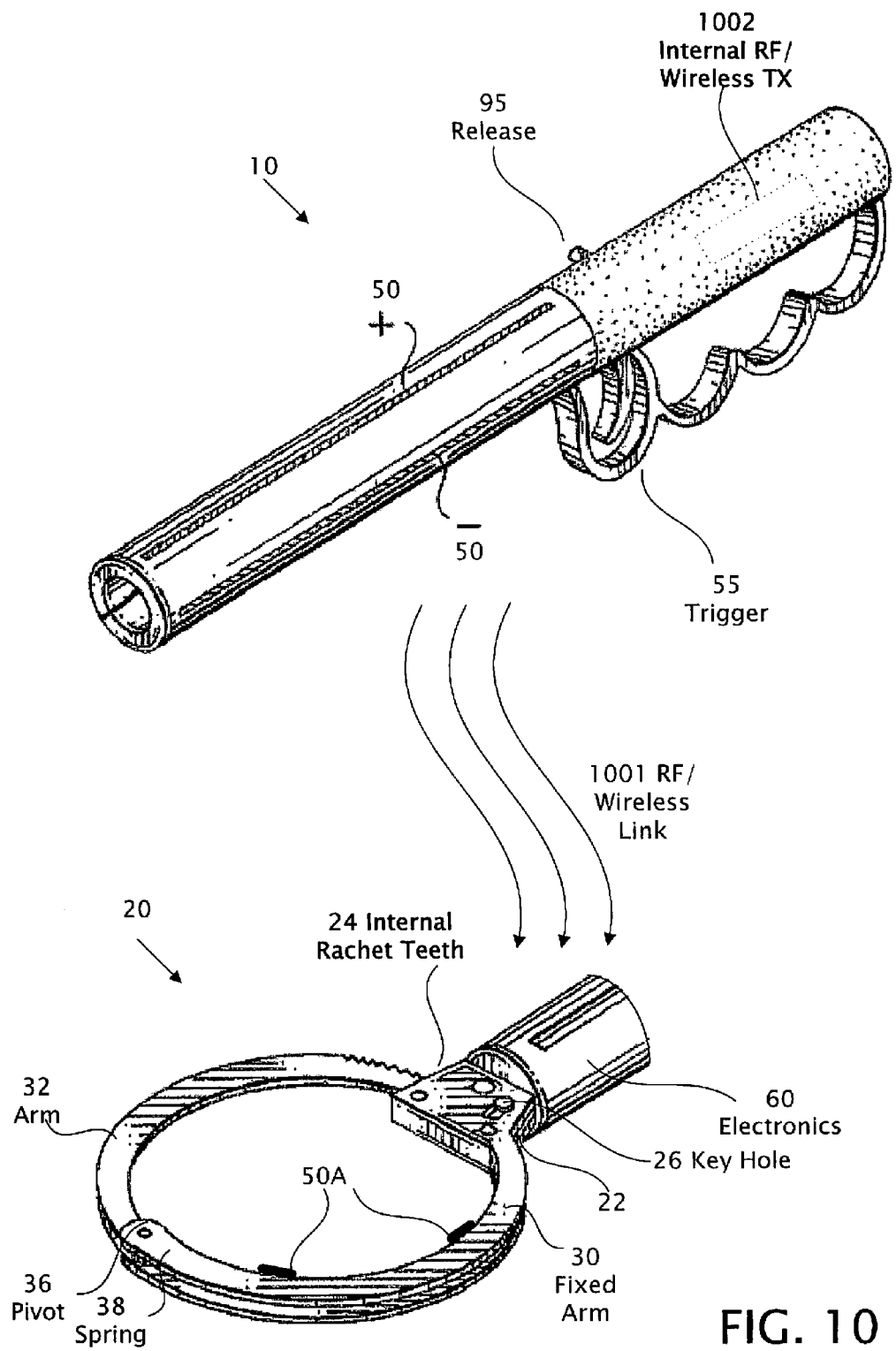
FIG. 10 shows an alternative example of a wireless controlled restraint and control device.

FIG. 10 shows an alternative example of a wireless controlled restraint and control device. In this example a need for conductors extending from the handle is eliminated as the electronic circuit 60 is part of the previously described cuff 20. Electrodes 50A are activated by the trigger 55 activating conventionally constructed transmitter electronics in the body 12 that are coupled wirelessly 1001 to an antenna and receiver electronics that are coupled to the electronic circuit 60. Optionally electrodes 50 may be incorporated into the body, with an additional electronic circuit (not shown, but as previously described) to create a stun baton after deployment of the cuff 20. The previously described tether release 94 may be used in this example to release the cuff 20 from the body 12. Alternatively the tether (80 of FIG. 3) may be included to provide added control.

In another alternative example, in the case of a detachable cuff having a wireless ling as shown in FIG. 10, two cuffs may be included in the device-one at each end, increasing it usefulness for example in riots and crowd control. Controls and circuitry are duplicated as needed to control the additional cuff.

Figure 11:
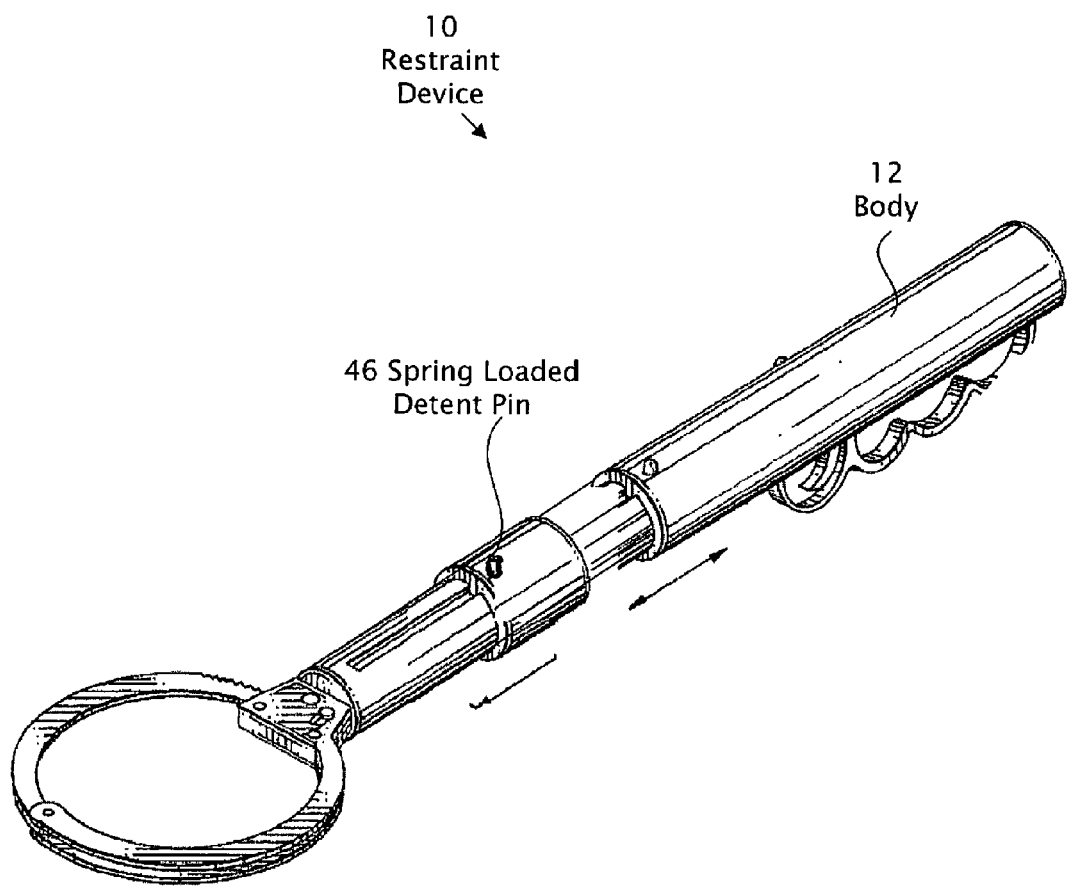
FIG. 11 is a perspective view of the restraint device of the including a compound telescopic extension of the rod and of the cuff from the handle.

FIG. 11 is a perspective view of the restraint device of the including a compound telescopic extension of the rod and of the cuff from the handle. The device may be extensible so the user may adjust the length of the body 12. A lower rod end 16 is slidable within the tubular body 12 in two locations allowing quick deployment. The lower rod end 16 longitudinally extends, and the piece having the catch 46, also moves away from the body 12 as it extends to an open position.

It will be obvious to those skilled in the art to make various changes, alterations and modifications to the example described herein. To the extent such changes, alterations and modifications do not depart from the spirit and scope of the appended claims, they are intended to be encompassed therein.

Those skilled in the art will realize that the process sequences described above may be equivalently performed in any order to achieve a desired result. Also, sub-processes may typically be omitted as desired without taking away from the overall functionality of the processes described above.

The invention claimed is:

1. A restraint device comprising:
   an elongate, generally tubular body having an upper and lower end;
   a lockable cuff having a non-deployed position at the lower end of the body, the cuff including at least one electrode;
   a tether coupled at one end to the cuff;
   a retractor coupled to the other end of the tether, the retractor being configured to wind up and pay out the tether;
   the cuff and tether both having a deployed position in which the cuff remains coupled to the tether and is released from the lower end of the body;
   a release for releasing the tether to be deployed; and
   at least one conductor coupled to a an electronic stunning circuit, and the conductor operatively coupled at the other end of the tether to the at least one electrode so that a charge may be delivered by the electrode to stun a detainee; and
   wherein the tether includes conductors connected to the circuit and to electrodes on the cuff.

2. The restraint device of claim 1 wherein the elongate, generally tubular body further comprises at least one electrode coupled to the electronic stunning circuit.

3. The restraint device of claim 2 wherein the delivery of a discharge from the electronic stunning circuit through the at least one electrode is selectively controlled by a trigger on the body.

4. The restraint device of claim 3 wherein a safety catch is associated with the trigger.

5. The restraint device of claim 1 wherein the lower end of the elongate, generally tubular body is telescopically extendable.

6. The restraint device of claim 1 wherein the upper end of the elongate, generally tubular body includes an insulated handle configured to receive the hand of a user.

7. The restraint device of claim 1 wherein the retractor is situated within the elongate, generally tubular body, and the retractor includes a spring-biased spool.

8. The restraint device of claim 1 wherein the cuff includes a double lock.

9. A device for restraining and controlling both humans and animals comprising:
   an elongate, generally tubular body having an upper end and a lower end, the upper end;
   a cuff, wherein the cuff has both a retracted position in which the cuff is secured at the lower end of the elongate, generally tubular body, and a deployed position in which the cuff is released from the lower end of the elongate, generally tubular body;
   at least one electrode disposed on the cuff;
   a retractor coupled to the elongate, generally tubular body;
   a tether coupled to the cuff at one end and having the opposite end coupled to the retractor, the remaining coupled to both the cuff and the retractor when the cuff is in the deployed position; and
   an electrical circuit operatively configured to deliver a high voltage, low amperage charge to the at least one electrode; and
   wherein the electric circuit is activated by a wireless transmitter in the handle being keyed, being coupled to the at least one electrode so that a charge may be delivered by the electrode to stun a detainee through activation at the grip area of the elongate, generally tubular body.

10. The device for restraining and controlling both humans and animals of claim 9 in which a second electrode of polarity opposite to the first electrode is disposed in the cuff at a distance from the first electrode such that the electrical circuit delivers a stunning shock.

11. The device for restraining and controlling both humans and animals of claim 9 in which the wireless transmitter activates the electrical circuit by a RF signal.

12. The device for restraining and controlling both humans and animals of claim 9 in which the elongate, generally tubular body is extensible.

13. The device for restraining and controlling both humans and animals of claim 9 further comprising electrodes disposed in the elongate, generally tubular body.

* * * * *